US008477976B2

(12) United States Patent
Sheikh

(10) Patent No.: US 8,477,976 B2
(45) Date of Patent: Jul. 2, 2013

(54) METHOD FOR THE DETECTION OF WHISTLING IN AN AUDIO SYSTEM

(75) Inventor: Naim Sheikh, London (GB)

(73) Assignee: GN ReSound A/S, Ballerup (DK)

(*) Notice: Subject to any disclaimer, the term of this patent is extended or adjusted under 35 U.S.C. 154(b) by 13 days.

(21) Appl. No.: 12/981,412

(22) Filed: Dec. 29, 2010

(65) Prior Publication Data

US 2011/0188685 A1 Aug. 4, 2011

(30) Foreign Application Priority Data

Dec. 29, 2009 (DK) ................................ 2009 70303

(51) Int. Cl.

| | |
|---|---|
| ***H04R 25/00*** | (2006.01) |
| *H04R 27/00* | (2006.01) |
| *H04R 3/00* | (2006.01) |
| *H04B 15/00* | (2006.01) |

(52) U.S. Cl.
USPC ................ 381/318; 381/83; 381/93; 381/95; 381/96; 381/312; 381/317

(58) Field of Classification Search
USPC .................. 381/317–318, 83, 93, 95, 96, 312
See application file for complete search history.

(56) References Cited

U.S. PATENT DOCUMENTS

| | | | | |
|---|---|---|---|---|
| 6,650,124 | B2 | 11/2003 | Roeck | |
| 7,106,871 | B1 * | 9/2006 | Nielsen et al. | 381/317 |
| 2003/0071635 | A1 * | 4/2003 | Roeck | 324/614 |
| 2006/0215852 | A1 | 9/2006 | Troxel | |

FOREIGN PATENT DOCUMENTS

| | | | |
|---|---|---|---|
| CN | 1398054 | A | 2/2003 |
| CN | 101371617 | A | 2/2009 |
| CN | 101516051 | A | 8/2009 |
| EP | 0 599 450 | | 6/1994 |
| EP | 1 742 509 | | 1/2007 |
| JP | 63 005697 | | 1/1988 |
| JP | 63 018796 | | 1/1988 |

OTHER PUBLICATIONS

First Office Action for Danish Patent Application No. PA 2009 70303 dated May 12, 2010.
Search Report for Danish Patent Application No. PA 2009 70303 dated Jun. 24, 2010.
Second Office Action for Danish Patent Application No. PA 2009 70303 dated Jun. 14, 2011.
Chinese Search Report dated Feb. 22, 2013 for CN Patent Application No. 201010612501.7, 2 pages.
Chinese First Office Action dated Mar. 4, 2013 for CN Patent Application No. 201010612501.7, 5 pages.

* cited by examiner

*Primary Examiner* — Duc Nguyen
*Assistant Examiner* — Matthew Eason
(74) *Attorney, Agent, or Firm* — Vista IP Law Group, LLP

(57) ABSTRACT

A method for detecting whistling in an audio system includes determining an average frequency of an input signal of the audio system, sampling the input signal in consecutive blocks of at least one sample, wherein the average frequency is determined blockwise, and determining whether feedback related whistling is present in the input signal of the audio system by evaluating a stability of the average frequency, wherein the evaluation of the stability of the average frequency comprises: determining a difference of two values of the determined average frequency for two blocks, and comparing the determined difference to a first threshold value.

13 Claims, 4 Drawing Sheets

METHOD FOR THE DETECTION OF WHISTLING IN AN AUDIO SYSTEM

PRIORITY DATA

This application claims priority to, and the benefit of, Danish Patent Application No. PA 2009 70303, filed on Dec. 29, 2009.

FIELD

The present application relates to a new method for the detection of whistling in an audio system in general and a hearing aid in particular. Furthermore, the present application relates to a hearing aid for execution of said method.

BACKGROUND

In a hearing aid it may occur that a fraction of the sound that that emanates from the receiver of the hearing aid may leak back to the microphone. This sound that leaks back to the hearing aid microphone will then be added to the microphone signal and amplified again. This process may thus be self-perpetuating and may even lead to whistling when the gain of the hearing aid is high. This whistling problem has been known for many years and in the standard literature on hearing aids it is commonly referred to as feedback, ringing, howling or oscillation.

Usually the onset of whistling is dependent on the gain in such a way that whistling will be more likely to occur the higher the gain is. Hence, whistling thus poses a limit on the maximum gain that may be achieved in most hearing aids.

An early approach to solve the problem of whistling was to manually reduce the gain, for example by adjusting a volume control, when the user experienced whistling. However, this solution to the problem of whistling is unsatisfactory, because the whistling is annoying for the user of the hearing aid, and the experience of whistling is usually painful and may even be directly harmful to the individual that experiences it. Therefore, it has been of great importance to develop methods of automatic whistle detection, before or no later than the onset of whistling, while at the same time providing the user of the hearing aid with as much gain as needed in order to compensate for the hearing loss of said user.

In order to achieve a high gain, while at the same time preclude whistling several automatic feedback cancellation, and whistle detection techniques have been employed in the past, one of which is disclosed in U.S. Pat. No. 6,650,124.

U.S. Pat. No. 6,650,124 discloses a method of reducing whistling in hearing aids, where the method comprises the step of evaluating whether a frequency component of an input signal is whistling by calculating the variance of the signal component and comparing it to a threshold. The whistle detection is thus based on a variance criterion. Then if it is determined that the frequency component relates to whistling, then a switch activates a notch filter that filters out the particular frequency. There are however, several drawbacks of this method of whistle detection and whistle suppression. First, the method disclosed in U.S. Pat. No. 6,650,124 does not disclose any efficient way of determining which frequency components of the input signal of the hearing aid needs to be analyzed by the variance criterion (in fact it is not clear how the signal is estimated, since U.S. Pat. No. 6,650,124 is silent with respect to this). Secondly, the application of a variance criterion comprises the calculation of a 2'nd power (a squaring calculation), which is a complicated arithmetical operation that requires much processing power and in addition to this a much wider dynamic range (e.g. when a 16 bit number is squared it becomes a 32 bit number), especially if one consider the limited processing power that is available in present day hearing aids. Thirdly, the proposed method of whistle suppression by the use of a notch filter is very inflexible and since a notch filter simply filters out a given frequency or a very narrow frequency region around a given frequency, the application of a notch filter for whistle suppression may lead to audible changes or distortions of the signal, which may be heard and perceived as annoying for a user. Furthermore, the predetermined width of the notch filter will imply that it in some circumstances will be too wide, while it in other circumstances will be too narrow, and in case of a false detection of whistling the application of the notch filter will lead to a perceptual loss of signal power.

SUMMARY

It is thus an object to provide a computationally effective and reliable method for the detection of whistling in hearing aids.

It is a further object to provide a hearing aid that is adapted to detect and suppress whistling.

It is an even further object to provide a hearing aid with a whistle detector and a feedback cancellation filter, wherein the whistle detector is operatively connected to the feedback cancellation filter.

According to some embodiments, the above-mentioned and other objects are fulfilled by a method for the detection of whistling in an audio system, wherein the method comprises the steps of determining an average frequency of an input signal of the audio system, and determining whether feedback related whistling is present in the input signal of the audio system by evaluating the stability of the average frequency.

Whistling is usually a substantially pure tone, typically a pure sinusoidal oscillation. Hence, under usual circumstances substantially all the signal power of the input signal will be concentrated around the average frequency of the input signal. Thus, the average frequency of the input signal is a good candidate for being a frequency that is related to whistling. However, since not all such average frequencies are related to whistling, the stability of the candidate frequency is determined, because if it is stable, then it may be concluded that it is highly likely to relate to whistling.

In a preferred embodiment the method may further comprise a step of sampling the input signal in consecutive (preferably overlapping) blocks of at least one sample, wherein the average frequency is determined blockwise. This is done because it leads to a great processing efficiency to perform the signal processing blockwise. By letting the blocks overlap the features of the input signal is better preserved. This advantage is probably better understood by considering the example of a digital implementation with no overlap and wherein a Fast Fourier Transformation is used to transform the signal into the frequency domain, then if for example windowing is used in order to preclude spectral leakage, then this windowing will lead to an attenuation of the signal at block boundaries, and hence to a loss of features in the signal. This loss of features can therefore be accounted for by letting the blocks overlap.

The evaluation of the stability of the average frequency may according to some embodiments comprise the steps of: Determining the difference of the determined average frequency for two (preferably consecutive) blocks, and comparing the determined difference to a first threshold value. Hereby is achieved a very easy way of determining the stability of the average frequency.

Preferably, the method may, according to other embodiments, further comprise the step of determining a function of the difference (of the determined average frequency for two (preferably consecutive) blocks). Hereby it is achieved that it is possible to tune the stability criterion in any suitable way that may be prescribed by the function. Especially it is of importance to choose a function that is as simple as possible while it at the same time will work. For example the function may be chosen to be one that gives more weight to input signals having a high signal pressure level than those signals that have a low signal pressure level. In other embodiments the function may be one that gives more weight to some frequencies, e.g. high frequencies, and less weight to other frequencies.

In a preferred embodiment, the function comprises the absolute value function. This is because we are only interested in how much the different average frequencies deviate from each other. We are for the purpose of determining the stability of the average frequency not interested in which one of them is larger than the other.

The function may in an embodiment be equal to 0 if the absolute value of the difference is less than a second threshold value. Hereby is achieved an arithmetically simple way of de-emphasising or discarding small fluctuations in the average frequency.

Furthermore, the function may in one embodiment be equal to the absolute value of the difference if the absolute value is larger than or equal to the second threshold value. Hereby is achieved an arithmetically simple way of emphasising larger fluctuations in the average frequency. This way the second threshold value may be tuned or chosen in dependence of a desired sensitivity of the stability criterion, since a large value of the second threshold value will lead to a less sensitive stability criterion, and a small value for the second threshold value will correspond to a more sensitive stability criterion.

For example the method of implementing a threshold can be efficiently computed using the binary "AND" operation when using fixed point arithmetic.

In one embodiment the method may further comprise the step of determining the average of the difference over a number of blocks. In a preferred embodiment, the step of determining the average may comprise the determination of a moving average. As a good working example a moving average of 9 blocks is used. This length of the moving average is chosen from experimentation and is a trade-off between being able to react to changes in the signal in a timely manner. For example a moving average lower than 9 blocks will lead to that the method will react to transients in the input signal, while a larger moving average may lead to a too slow reaction. Furthermore, using a moving average of more than 9 blocks will require use of more memory. Thus, the selection of the block length of the moving average may also be chosen in dependence of how much memory is available for the implementation of the method according to some embodiments.

Preferably, the method may further comprise the steps of transforming the input signal into the frequency domain. Hereby is an easy frequency resolution of the input signal is achieved. The frequency transformation is preferably a Fourier Transformation, and since the input signal is a sampled signal, i.e. essentially a discrete sequence of numbers, the Fourier Transformation is preferably a Discrete Fourier Transformation (DFT), such as a Fast Fourier Transformation (FFT) of a certain length, say N. Preferably radix 2 is used, whereby the FFT assumes an arithmetically simple so called butterfly structure. However it is understood that any suitable radix and any suitable frequency transformation may be used. Simulations show that for example an FFT of length N=64 works very well.

According to another preferred embodiment, the method may further comprise a step of comparing the power or energy content of the input signal with a third threshold value. Hereby is achieved a robustness criterion, because if the power or energy content of a stable frequency (that thus is indicative of whistling) is below a third threshold, then the whistling may not be audible and therefore not pose any potential annoyance for the user of the audio system. However, low level signals are less likely to be whistling, but may still be audible. Thus, in other embodiments, the power level will be set above an audible level as compared to an average person with substantially no hearing loss, or set at a value above an audible level that is chosen dependence on a particular hearing loss of a user of the method.

Furthermore, in other embodiments, it is contemplated that if the power or energy content of the input signal is less than the third threshold value, then the steps of determining the stability of the average frequency is bypassed and the method or algorithm of whistle detection will give an output indicating that no whistling is present in the input signal. Hereby is achieved that the processing power relating to the calculation of the stability of the average frequency may be saved.

It is envisaged that the average frequency of the input signal may be computed by any conventional method, and the mean may be a weighted or a non-weighted mean. The advantage of using a weighted mean is that it is easily applicable to the use of the Fourier transformation. According to a preferred embodiment of the method, the determination of the average frequency of the input signal may comprise the step of determining the centroid of the input signal. Preferably, the average frequency is calculated as the centroid of the input signal. In a preferred embodiment, the centroid of the input signal is the spectral centroid of the input signal, which in this embodiment is the midpoint of its spectral density function. In other embodiments the centroid of the input signal may be the midpoint of the power spectral density function or the energy spectral density function.

In a preferred embodiment of the method the centroid of the input signal is calculated as the weighted mean of the frequencies in the input signal, with their magnitudes as weights.

The centroid thus plays the same role for a signal, e.g. a digital signal, as the center of mass does for a material body. Thus, it is seen that the centroid gives a good, reliable and cost effective (in terms of processing power) way of estimating the frequency at which most of the power or energy content of the signal is concentrated. Since, whistling usually is a pure sinusoidal tone signal most of the power of a whistle signal will be concentrated at one frequency. Thus, the calculation of the centroid of a signal will give a good candidate frequency for further examination for stability.

In some embodiment, the audio system is a communication system chosen, such as a hearing aid or a headset or a telephone system, where the telephone system may be a telephone, a video conferencing system or merely a teleconferencing system.

An object is furthermore achieved by a hearing aid comprising a microphone for the provision of an input signal, a signal processing unit, a whistle detector that is adapted to detect whistling in the hearing aid and a receiver for the provision of an output sound signal to be presented to the user of said hearing aid, wherein the whistle detector is adapted to execute the steps of the inventive method described above. Hereby is achieved a hearing aid that is adapted to effectively and reliably detect whistling, when such whistling is present in said hearing aid. Such a hearing aid with a whistle detector that is adapted to execute a method as described above is especially applicable to hearing small hearing aids that are openly fitted or have a large ventilation canal, because for those kind of hearing aids the feedback path may be so short that an adaptive feedback cancellation filter in some certain situations may not be able to suppress the whistling efficiently enough.

However, it is understood that embodiments of the hearing aid described herein may be an in-the-canal, in-the-ear, behind-the ear or otherwise mounted hearing aid.

The hearing aid may in a preferred embodiment furthermore comprise a feedback cancellation filter. Preferably the feedback cancellation filter is operatively connected to the whistle detector. Hereby is achieved a hearing aid that is able to detect whistling and to suppress or annihilate said whistling by using the feedback cancellation filter. Furthermore, it is achieved that the whistle detector may react more quickly, due to the information that may be obtained from the feedback cancellation filter. On the other hand the operative connection between the whistle detector and the feedback cancellation filter may be used to update, the filter coefficients, whereby a quicker suppression of whistling may be obtained. If an adaptive feedback cancellation filter is used, then information from the whistle detector may be used to update the filter coefficients, whereby a quicker adaptation may be achieved. In general the hearing aid may in alternative embodiments comprise a feedback cancellation filter that is static. The feedback cancellation filter may be a digital feedback cancellation filter, and it may be placed in a feedback path or a forward signal path of the hearing aid.

The communication between the whistle detector and the feedback cancellation filter may in some embodiments be a two way communication, where information from the whistle detector is used in the feedback cancellation filter, and where information from the feedback cancellation filter is used in the whistle detector.

In other embodiments, the communication between the whistle detector and the feedback cancellation filter may be a one way communication from the whistle detector to the feedback cancellation filter, or a one way communication from the feedback cancellation filter to the whistle detector.

The hearing aid may advantageously be adapted to adjust at least one parameter of the feedback cancellation filter in response to detection of whistling. Hereby it is achieved that the feedback cancellation of the hearing aid is improved, since the filter is adapted in response to detection of whistling. A further advantage of this embodiment is that it provides a hearing aid that is capable of catching the whistle tones that the feedback filter fails to prevent. Additionally, an even further advantage of this embodiment is that it provides means by which to prevent a reaction to whistle detection when the whistle comes from an external source, like for example a flute concert.

In a preferred embodiment, the hearing aid may further comprise an amplification controller that is adapted to adjust the gain of the hearing aid in dependence of detection of whistling. Since the probability of whistling depends heavily on the amplification, i.e. the gain, of the hearing aid, it is hereby achieved a hearing aid wherein the amplification controller may be adapted to reduce the gain of the hearing aid in response to detection of whistling. The amplification controller may preferably be an AGC (Automatic Gain Control) unit that may be operatively connected to the signal processing unit or the whistle detector. Alternatively, the amplification controller may be operatively connected to both the signal processing unit and the whistle detector, whereby it is achieved that the gain reduction may be controlled automatically in response to the detection of whistling.

Another advantage is that the cooperation of the whistle detection and the amplification control, such as an AGC unit, may work as an emergency break if the feedback cancellation filter fails to cancel or suppress the whistling in the hearing aid.

If whistling is present in the hearing aid, then the gain must be reduced relatively quickly in order to avoid unnecessary exposure to the whistle tone, but then increased slowly again in order to avoid frequent and annoying changes in the gain. Therefore, the response time of the amplification controller may in a preferred embodiment be depending on whether whistling is detected or not. From these response times, which may be constants, the actual gain change is calculated. This gain change may then in an embodiment be subtracted from the gain factor that the AGC unit determines in response to the gain calculations that are used in order to compensate for the hearing impairment of the user.

In some embodiments, the response time may comprise an attack time and a release time. Said attack time or said release time, may be adjusted adaptively in response to the detection of whistling for a predetermined period of time. Preferably, said attack time or said release time, may be adjusted adaptively in response to the detection of a substantially constant level of whistling for a predetermined period of time. In another embodiment both said attack time and said release time may be adjusted adaptively in response to the detection of whistling, preferably in response to a substantially constant level of whistling. Here it should be understood that by the level of whistling it is meant at which gain level onset of whistling will occur. This embodiment is especially advantageous in those situations where a substantially constant level of whistling is detected. Such a situation may for example be when a user of the inventive hearing aid is standing next to a wall. If constant attack or release times are used in such a situation, then the amplification controller will alternately attenuate and amplify the gain of the hearing aid. This may be annoying for the user, and may in certain situations even worsen the user's perception of speech. Thus, if a substantially constant level of whistling is detected for a predetermined period of time, then for example the release time may be incremented by a certain value (this value may be constant or a variable). These increments of the release time may in some embodiments be iterated as long as the level of whistling is substantially constant. However, in a preferred embodiment, the adaptation of the release time may be stopped after a certain number of iterations (this certain number may be 0 or 1, but is preferably a number greater than 2 and less than 30) and the gain of the hearing aid may be adjusted to be at a constant level that is below that level wherein whistling is detected. The gain may for example be adjusted to be kept on this constant level for a predetermined period of time, say 1 minute, where after the gain is released. This predetermined period of time may be a constant or it may be varied in response to the substantially constant level of whistling (it may for example be a predetermined function of the level of whistling), or it may be varied in response to for how long time the substantially constant level of whistling has been detected, or it may even be varied in response to whether the level of onset of whistling has increased or decreased during the adaptation. In a similar way the attack time may be adapted.

In an advantageous embodiment of a hearing aid, the amplification controller may successively determine gain correction values, and any gain correction value may depend on at least one of the previous gain correction values. Preferably, the gain correction values at any time depends recursively on the previous values. This smoothes the gain change rate and causes that the gain correction value is significantly larger after several consecutive blocks results in positive whistle detection, while sporadic occurrences of whistling will result in much less attenuation. This in turn ensures that when there is a long sequence of whistling detected, the gain is reduced to a level that requires more time to be significantly increased.

In certain situations alarms or warning signals may be important for the user of the inventive hearing aid. Such situations may be in traffic or in a ship, where it is of crucial importance that the user may be able to hear these warning signals. Often such warning signals are some kind of howling sounds. Now warning signals are substantially constant for a certain period of time, or they may be periodic bursts of a certain length. Thus the amplification controller may in such situations attenuate the gain down to the maximum level of attenuation. Therefore, an advantageous embodiment may comprise an amplification controller which may be adapted to cease the attenuation, if the level of attenuation has been substantially equal to the maximum level of attenuation for a predetermined period of time. This implies that the gain will be released if the attenuation has been maximal for a predetermined period of time. The release may in some embodiments only apply to a certain subset of the frequency range, wherein whistling has been detected. Preferably, the gain will be released and raised to a higher level only for a second predetermined period of time.

In accordance with some embodiments, a method for detecting whistling in an audio system includes determining an average frequency of an input signal of the audio system, sampling the input signal in consecutive blocks of at least one sample, wherein the average frequency is determined blockwise, and determining whether feedback related whistling is present in the input signal of the audio system by evaluating a stability of the average frequency, wherein the evaluation of the stability of the average frequency comprises: determining a difference of two values of the determined average frequency for two blocks, and comparing the determined difference to a first threshold value.

In accordance with other embodiments, a hearing aid includes a microphone for the provision of an input signal, a whistle detector unit that is configured to detect whistling in the hearing aid, and a receiver for the provision of an output sound signal to be presented to a user of the hearing aid, wherein the whistle detector is configured for determining an average frequency of an input signal of the audio system, sampling the input signal in consecutive blocks of at least one sample, wherein the average frequency is determined blockwise, and determining whether feedback related whistling is present in the input signal of the audio system by evaluating a stability of the average frequency, wherein the evaluation of the stability of the average frequency comprises determining a difference of two values of the determined average frequency for two blocks, and comparing the determined difference to a first threshold value.

Other and further aspects and features will be evident from reading the following detailed description of the embodiments.

While several embodiments are described herein, it is to be understood that any feature from an embodiment may be included in any of other embodiments. Also, as used in this specification, the term "an embodiment" or similar terms, such as "some embodiments", "other embodiments" or "preferred embodiment" may refer to any one(s) of the embodiments described herein.

BRIEF DESCRIPTION OF THE DRAWINGS

In the following, preferred embodiments are explained in more detail with reference to the drawing, wherein.

DESCRIPTION OF PREFERRED EMBODIMENTS

Figure 1:
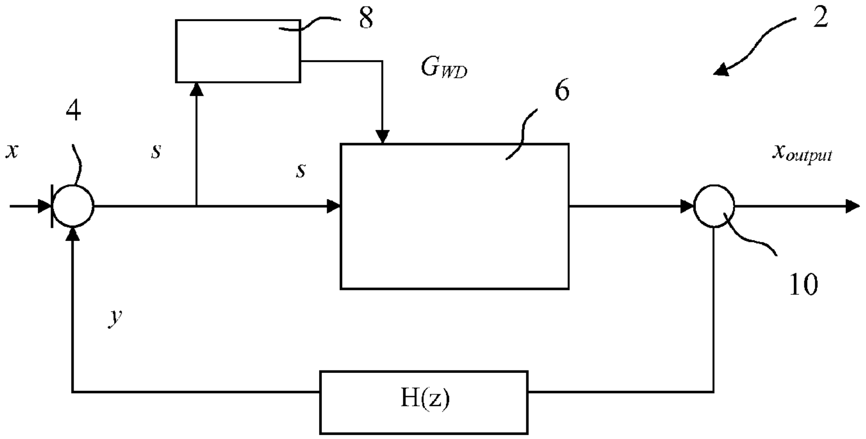
FIG. 1 shows a simplified block diagram of a hearing aid according to some embodiments.

The embodiments will now be described more fully hereinafter with reference to the accompanying drawings, in which exemplary embodiments are shown. It should be noted that the figures are not drawn to scale and that elements of similar structures or functions are represented by like reference numerals throughout the figures. Like elements will, thus, not be described in detail with respect to the description of each figure. It should also be noted that the figures are only intended to facilitate the description of the embodiments. They are not intended as an exhaustive description of the invention or as a limitation on the scope of the invention. The claimed invention may, however, be embodied in different forms and should not be construed as limited to the embodiments set forth herein. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 shows a simplified block diagram of a hearing aid 2 according to some embodiments. The hearing aid 2 comprises a microphone 4 for the provision of an input signal s, a signal processing unit 6, a whistle detector 8 that is adapted to detect whistling in the hearing aid 2 and a receiver 10 for the provision of an output sound signal $x_{OUTPUT}$ to be presented to the user of said hearing aid 2. The signal x represents the sound that reaches the microphone 4 of the hearing aid 2. Some of the processed signal that is fed into the receiver 10 travels back to the microphone 4 along a feedback path defined by the transfer function H(z), resulting in the feedback signal y that is added to the new input x. The summed result is the signal s. Preferably the whistle detector 8 is a integrated part of the signal processing unit 6.

The hearing aid 2 is preferably a digital hearing aid, and the digitalization of the input signal s may for example be provided by an ND converter (not shown) that is inserted in the signal path after the microphone 4, or the ND converter may simply be an integrated part of the microphone 4. Here the word microphone should be understood broadly as some kind of transducer, i.e. a unit that is able to transform one kind of energy into another kind of energy; in this case the transducer/ microphone 4 transforms the energy content of sound waves into an electrical signal (which itself naturally carry energy).

In such a digital version of the hearing aid 2, the input to the signal processing unit 6 is a certain number of samples of the s signal, say B samples. Thus the signal s is processed within the signal processing unit 6 in blocks of B samples at a time.

Figure 6:
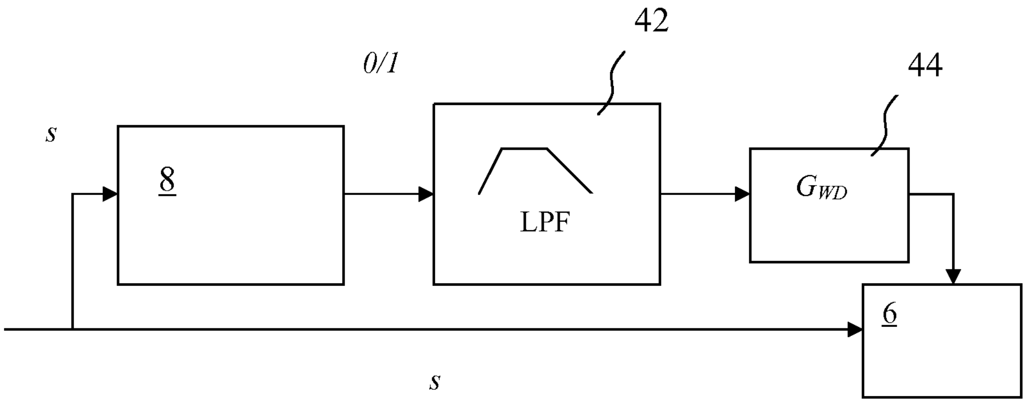

The gain function $G_{WD}$ shown in FIG. 1 is explained in more detail with respect to the description of FIG. 6.

Figure 2:
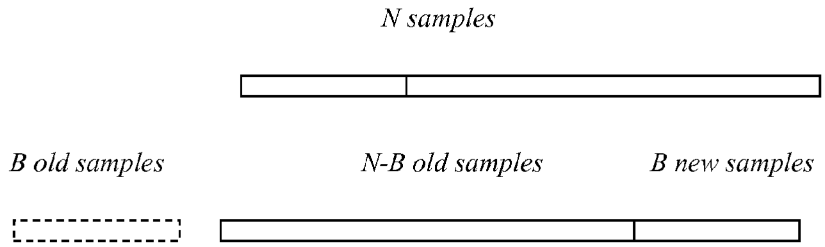
FIG. 2 is a block diagram illustrating the rotating block samples of the input signal to the whistle detector.

In FIG. 2 is a block diagram depicted that illustrates the rotating block samples of the input signal s to the whistle detector 8. The input to the whistle detector 8 is a block of, say N samples of the s signal, where N>B. This longer signal block is formed by appending the B samples of the s block to an (N−B)-sized block, where the first B samples are removed and subsequently adding B new samples to the same (N−B)-sized block. This creates a circular flow of data corresponding to a first in, first out principle as illustrated in FIG. 2. The input block may be transformed to the frequency domain by a N-point FFT.

Figure 3:
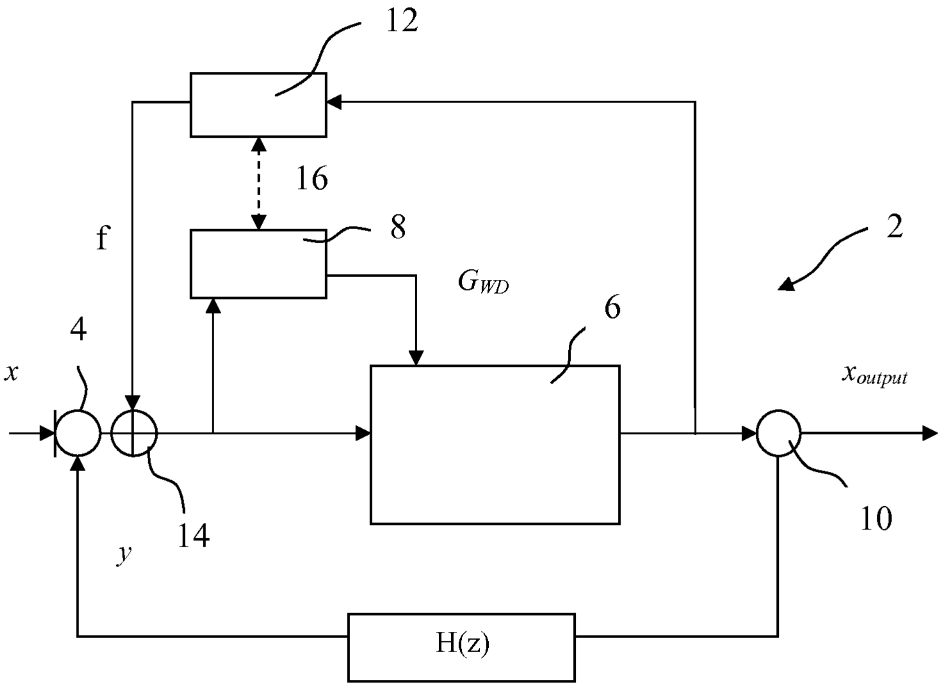
FIG. 3 shows a simplified block diagram of another hearing aid according to other embodiments.

FIG. 3 shows an alternative embodiment of a hearing aid 2 according to other embodiments that furthermore comprises a feedback suppression filter 12, preferably an adaptive digital feedback suppression filter that is operatively connected to the whistle detector 8, as is indicated by the double arrow 16. The feedback suppression filter 12 generates a signal f that is subtracted from the input signal s at the adder 14, whereby feedback, i.e. whistling is precluded. In an ideal situation wherein the feedback suppression filter 12 works adequately and is able to suppress feedback, then there is ideally no whistling in the signal after the adder 14. However, in the case where the feedback suppression filter 12 fails and whistling arises, the whistle detector's 8 job is to catch this whistling and initialize a reaction to it. Furthermore, in those situations wherein the feedback suppression filter 12 is not able to react quickly enough in order to suppress whistling, the whistling would be caught by the whistle detector 8. Furthermore, as indicated by the arrow 16, a reaction to whistling by the whistle detector 8, may be used to update the feedback suppression filter 12, so that it would be able to adapt to the whistling more quickly than else. Furthermore, if the feedback suppression filter 12 reacts to whistling this information may be used by the whistle detector 8, so that it may be able to react more quickly to the whistling.

It is understood that in one embodiment the arrow 16, may be a one way arrow from the feedback suppression filter 12 to the whistle detector 8, or a one way arrow from the whistle detector 8 to the feedback suppression filter 12.

Figure 4:
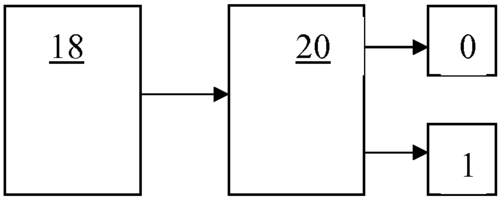
FIG. 4 is a simplified block diagram illustrating a method of whistle detection according to some embodiments.

FIG. 4 shows a simplified block diagram illustrating a method of whistle detection according to some embodiments. The illustrated embodiment comprises a step 18, wherein the average frequency of an input signal is determined and a step 20, wherein the stability of the average frequency is determined. The output of the method is either a 0 indicating that no whistling is present in the input signal, or a 1 indicating that whistling is present in the input signal.

Figure 5:
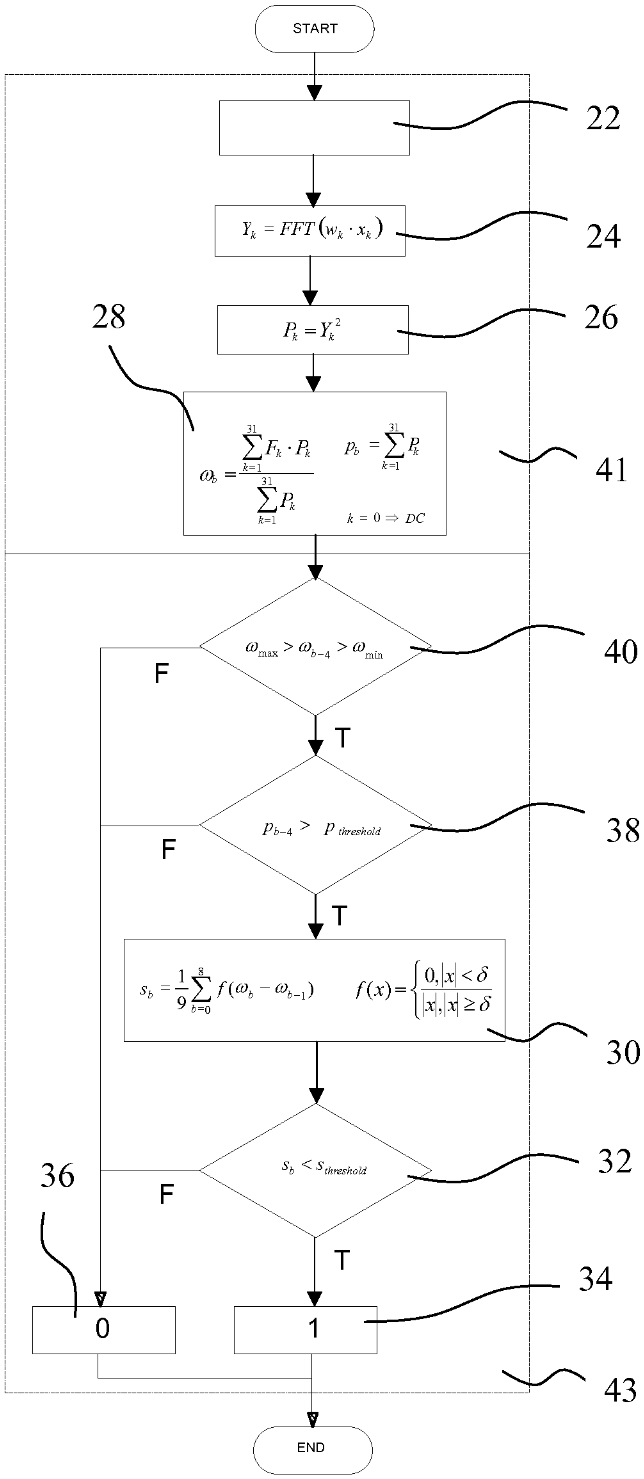
FIG. 5 is a simplified block diagram illustrating another method of whistle detection according to other embodiments, and FIG. 6 schematically illustrates a whistle detector block including the algorithm shown in FIG. 4 or 5, a low pass filter and a gain function.

FIG. 5 shows a block diagram illustrating an embodiment of a whistle detection algorithm. The input to the whistle detection algorithm is a signal which is sampled by adding 24 new samples to a 64 samples input buffer, and 24 old samples are appended according to the first in first out principle shown in FIG. 2. This sampling is indicated by the block 22. In the next step 24 this sampled input signal is transformed to the frequency domain by using a 64 point Windowed FFT:

$$Y_k = \mathrm{FFT}(w_k \cdot x_k),$$

where $w_k$ is a window function and $x_k$ is the sampled input signal. The FFT is windowed in order to account for spectral leakage. The window that is used may for example be a Hamming window or a Hanning window. Next, as indicated by step 26, the power of the sampled signal is computed:

$$P_k = Y_k^2$$

Preferably only the magnitude spectrum is used. Thus, all phase information is discarded. Hereby the computational problem is reduced. Then in step 28 the average frequency of the sampled signal is computed. In the illustrated embodiments of the method, the average frequency is determined by calculating the power spectral centroid of the sampled signal:

$$\omega_b = \frac{\sum_{k=1}^{31} F_k \cdot P_k}{P_b}, \text{ where } P_b = \sum_{k=1}^{31} P_k$$

where $P_k$ is the power magnitude at bin number k and $F_k$ is the center frequency of that bin and $P_b$ is the total signal power in the b'th block. The summation over k runs from k=1 to 31, due to the symmetry of the FFT and that the DC and Nyquist frequency components are neglected (In this example the index 0 corresponds to the DC bin and ascending bins are incrementing in the positive frequency direction).

The power spectral centroid as described above is the most simple and straightforward method of computing an average frequency. The mean computed by this method may also be referred to as an arithmetic mean. In other embodiments, other methods of computing an average frequency which may also be applied include the computation of the harmonic mean, the geometric mean, the quadratic mean, the maximum and/or any combination of these. Quadratic mean, also known as Root Mean Square, is used especially for electronics and is advantageous if the number set includes positive and negative numbers and may also be used in the present embodiment. The harmonic mean is typically advantageous when calculating the mean of a set of rates or ratios and also in this embodiment, the method may be used to provide a frequency mean. Furthermore, the geometric mean may be used when looking at multiples or logarithms, and could be useful in some embodiments. All of these means will provide an indication of whether a whistle tone is present or not. The larger a peak the whistle tone provides with respect to the other frequencies present, the closer the calculated mean will be to the whistle tone frequency. By using the maximum, only the frequency with the largest amplitude is provided. If this frequency is the whistle tone frequency, then the exact whistle tone frequency is provided, but if this is not the case, one of the other methods for computing a mean will be preferable. Thus, typically, this method will be combined with one of the other methods. The illustrated method also comprises a step 30 of determining a function of the difference of the determined centroid for 9 consecutive blocks (9 being the chosen input buffer size in this example) averaged over the buffer size of 9. Mathematically this may be expressed by the calculation of the number:

$$s_b = \frac{1}{9} \sum_{b=0}^{8} f(\omega_b - \omega_{b-1})$$

Preferably the function $f$ is chosen to be equal to zero if the absolute value of the difference between two consecutive values of the centroid is less than a second threshold value δ, and equal to the absolute value if the absolute value of the difference between two consecutive values of the centroid is larger than or equal to the second threshold value δ. Thus, mathematically the function ƒ may be defined by the equation:

$$f(x) = \begin{cases} 0, & |x| < \delta \\ |x|, & |x| \geq \delta \end{cases}$$

Hereby is achieved that fluctuations in the centroid that are smaller than δ is disregarded, and only those fluctuations, that are larger than or equal to δ are contributing to the number $s_b$. The reason for using the absolute value function is that it is important that all fluctuations above δ is contributing to the number $s_b$. We are so to say not interested in which centroid value is greater than the other, but only in how much they deviate from each other. In one embodiment δ is chosen to be any suitable value in the interval 0.0001 to 0.01. In a preferred embodiment δ is chosen to be any suitable value between 0.001 and 0.01, such as 0.001, 0.003, 0.004, 0.005, 0.006, 0.007, 0.008 or 0.009.

The stability of the centroid is then checked in step 32, by comparing the number $s_b$ to a first threshold value $s_{threshold}$. More specifically it is checked whether the following inequality is true or false:

$$s_b < s_{threshold}$$

If this inequality is true, as indicated by the output T from the block 32, then it is indicative of that the centroid of the input signal is stable, and hence that feedback related whistling is present in the input signal. The method or algorithm will in this case give the binary output 1 (see block 34), which is thus indicative of that whistling has been detected. If on the other hand it turns out that the above inequality is false, as indicated by the output F from block 32, then the centroid is unstable, which is indicative of that no feedback related whistling is present in the input signal. The method or algorithm will in this case give the binary output 0 (see block 36), which is thus indicative of that whistling has been detected. In one embodiment $s_{threshold}$ is chosen to be a suitable number between 0.0001 and 0.01, preferably between 0.001 and 0.01, such as 0.002, 0.003, 0.004, 0.005, 0.006, 0.007, 0.008 or 0.009.

It should be understood that the chosen values of δ and $s_{threshold}$ may depend on how the illustrated method is implemented.

In addition to this, the illustrated embodiment may comprise an optional step 38 of checking whether the power of the input signal is larger than a third threshold value $P_{threshold}$. Mathematically, this can be expressed as whether the following equation holds true:

$$P_{b-4} > P_{threshold}$$

Feedback related whistling is usually associated with a high power, and additionally feedback related whistling is only a problem for a user if the power of that whistling is high. Thus, by checking whether the above inequality is true as indicated by the output T of block 38, or false as indicated by the output F of block 38, a simple criterion of ruling out whistling may be achieved that in many cases will be adequate. This is because if the above inequality is false, then this is indicative that the total power of the signal is below a threshold value, $P_{threshold}$, wherein the signal can not be (or is at least highly likely not to be) whistling. Thus if the output of block 38 is F then the algorithm will give the binary output 0, as shown in block 36, which is an indication of that no whistling is detected in the input signal. If on the other hand the above inequality holds true, i.e. the output of block 38 is true, then feedback related whistling may be present in the input signal, and whether this is the case or not is determined in the subsequent steps 30 and 32 as described above. In the above equation the indexing b−4 has been used. This is because it in the illustrated embodiment is necessary to account for the group delay when performing the power check in step 38. Thus, that the power has index (b−4) is intentional and is done in order to ensure phase alignment of different signals processed according to the illustrated embodiments of the method. Here the number 4 is related to there being 9 blocks yielding a power index of b−(N−1)/2, where N in the illustrated embodiment is 9. Thus, the signal processing associated with step 30 and 32 of the method is avoided altogether if the power check in step 38 yields a false output F. Hereby signal processing power saved, and consequently battery load is lowered as well. This is of critical importance in for example hearing aids, wherein only very little processing power and low power batteries are available. In one embodiment $P_{threshold}$ is chosen to be between 40 dB and 90 dB, and in another embodiment it may be chosen to be between 50 dB and 75 dB, and in a preferred embodiment $P_{threshold}$ is chosen to be between 50 dB and 70 dB, such as for example 55 dB, 60 dB or 65 dB. In the illustrated embodiment scientific investigations, for example computer simulations, have shown good results if $P_{threshold}$ is chosen to be between 55 dB and 65 dB.

Furthermore, since feedback related whistling is most likely to occur in a certain frequency range, typically at the higher frequencies, the method may in the illustrated embodiment also comprise an optional step 40 of checking whether the centroid lies within a frequency range wherein whistling is likely to occur. Mathematically, this can be expressed whether the following mathematical statement holds true:

$$\omega_{min} < \omega_{b-4} < \omega_{max}$$

Again the indexing b−4 is used in order to account for group delay. Thus if the above statement is false, as indicated by the output F of block 40, then this is means that the centroid of the input signal is either lower than $\omega_{min}$ or larger than $\omega_{max}$, that is the centroid lies in a frequency range wherein feedback related whistling is likely not to occur, and the output of the method or algorithm will be a binary 0 indicating that no feedback related whistling is present in the input signal. If on the other hand the centroid of the input signal is larger than $\omega_{min}$ and smaller than $\omega_{max}$ then this is indicative of that the centroid lies within a frequency range wherein whistling may occur, which is indicated by the output T of block 40. If this is the case, then the stability of the centroid needs be determined in the steps 30 and 32, possibly preceded by the optional step 38, wherein the power of the input signal is compared to a threshold value. In one embodiment of the method, the value of $\omega_{min}$ is equal to 1 kHz, in another embodiment it is 2 kHz, but it may in general be chosen to be any value there between. In a preferred embodiment, the value of $\omega_{max}$ may be chosen to be any suitable value in the interval from 4 kHz-8 kHz, preferably between 4.5 kHz and 7.5 kHz, even more preferably between 4.5 kHz and 7 kHz, such as 5 kHz, or 5.5 kHz, or 6 kHz, or 6.5 kHz. Alternatively, $\omega_{max}$ may be chosen to have a value above 8 kHz, e.g. 9 kHz, 10 kHz, 11 kHz, 12 kHz, 13 kHz, 14 kHz, 15 kHz, 16 kHz, 17 kHz, 18 kHz, 19 kHz, or kHz.

Essentially, the illustrated embodiment of the whistle detection method comprises two parts, a feature extraction part 41, and a decision part 43. The feature extraction part 41 comprises in the illustrated embodiment the steps 22, 24, 26, and 28, wherein the centroid of the input signal is determined. In the illustrated embodiment the centroid is determined in the frequency domain, but it is understood that the centroid could in an alternative embodiment also be determined in the time domain. In the illustrated embodiment the decision part 43 comprises the steps 30, 32, 38, and 40. In an alternative embodiment the decision part 43 could only comprise the steps 30 and 32, and in another alternative embodiment the decision part 43 could comprise the steps 30, 32 and either one of the steps 38 and 40.

FIG. 6 schematically illustrates a whistle detector 8 that for example is adapted to execute a whistle detection algorithm as described above with reference to FIG. 4 or FIG. 5. First, the whistle detection algorithm according to the inventive method outputs a binary value "0" or "1" (indicated as 0/1 in FIG. 6) that depends on whether or not whistling has been detected.

This value is then according to some embodiments used to determine an eventual difference in gain from the one determined independently by the signal processing unit 6.

Two examples of whistle detection algorithms have been described above and an example of a gain calculation that follows it will be described below.

The final output of the whistle detector 8 is either "0" for no whistling detected or "1" for whistling detected. The action to be taken in the latter case may in some embodiments be a gain reduction in order to return to stable gain and thus eliminate whistling. The gain must be reduced relatively quickly to avoid unnecessary exposure to the whistle tone, but then increased slowly to avoid frequent and thus annoying changes in gain. The whistle detection algorithm output is therefore followed by a low pass filter 42 defined by two time constants, an attack time and a release time. The choice of time constant depends on the output of the whistle detection algorithm according to the inventive method, for example an attack time for a "1" and a release time for a "0".

As it is undesirable for the gain level to change abruptly as a direct function of the whistle detector's 8 output, it is shown by the next equation below how the time constants discussed above may be used to define a new value that can take on a larger range of values than the whistle detector's 8 binary output, $x_{WD}$. It is this value that determines how much to increase or reduce the gain. The chosen time constant is inserted instead of $\alpha$ below:

$$b_{WD}{}^{i}=(1-\alpha)\cdot(b_{WD}{}^{i-1})+\alpha\cdot x_{WD}{}^{i}$$

Where the gain correction value $b_{WD}{}^{i}$ is recursively updated by using the filter output of the previous block of signal samples.

The actual gain reduction is then calculated within a certain interval, for example [−12;0], so that the gain in dB is reduced (if whistling is detected) by a value lying within this interval. This is illustrated by the equation:

$$G_{Wd}{}^{k}=-12\cdot b_{WD}{}^{k}+0$$

This gain change is illustrated by the unit 44 in FIG. 6 and is subtracted from the gain factor in dB that is determined by the signal processing unit 6 that determines a gain in order to compensate for the hearing impairment of the user, so that the minimum gain reduction is 0 dB and the maximum is −12 dB. A maximum gain reduction of −12 dB is only one of a wide variety of maximum gain reduction values. These could for example be −20 dB, −6 dB or any suitable value between these. In some embodiments, the maximum gain reduction may be chosen in dependence of what program is used in the hearing aid to compensate for the hearing loss of the user. In certain situations the maximum gain reduction values may be chosen in dependence of the type of hearing loss of the user as well as the severity of said hearing loss.

The chosen time constants $\alpha$ used in the above equation will preferably be chosen in dependence on whether whistling has been detected and may in one embodiment of the inventive method be determined by:

$$\alpha=(1-x_{WD}{}^{i})\cdot\alpha_{wdr}+x_{WD}{}^{i}\cdot\alpha_{wda}$$

Where $\alpha_{wda}$ and $\alpha_{wdr}$ are the gain reduction attack and release times, respectively. The subscript wd refers to the fact that these time constants are relevant for the whistle detection module, to avoid confusion with other time constants. Suitable values for the attack time may be a value between 0.01 and 0.1, preferably it may, however, be a value between 0.02 and 0.08. The release time will in a preferred embodiment be smaller than the attack time. Suitable values for the release time may be a value between 0.00001 and 0.001, preferably it is a value between 0.0001 and 0.0009. While these examples are realistic, there may be circumstances where the attack or release times may assume values that lie outside the mentioned intervals.

The three steps expressed in last three equations above reveal that the gain correction value ($b_{WD}{}^{i}$) not only depends on the binary output of the whistle detector, and the maximum gain change factor, but also recursively on previous values of the low-pass filter ($b_{WD}{}^{i-1}, b_{WD}{}^{i-2}$ . . . ). This smoothes the gain change rate to some extent and means that the gain correction value is significantly larger after several consecutive blocks result in positive detection, while sporadic occurrences of whistling will result in much less attenuation. This in turn ensures that when there is a long sequence of whistling detected, the gain is reduced to a level that requires more time to be significantly increased again.

The time constants used in gain reduction are applied in a low pass filter 42 that is dependent on a previous value. The low-pass filtering is done in such a way that a larger value is required in order to quickly reduce gain, while much smaller values allows for a slow gain increase.

Alternatively it could be an amplification control unit, like for example an automatic gain control unit (AGC) that determines the gain within the hearing aid 2 instead of the digital signal processing unit 6 shown in FIG. 6. The result would be the same, i.e. a minimum gain reduction of 0 dB and a maximum gain reduction of for example −12 dB. The amplification control unit may be operatively connected to the signal processing unit 6.

In an alternative embodiment, the whistle detector 8, low pass filter 42 and gain changing unit 44 is built into the signal processing unit 6 of the hearing aid 2, whereby whistle detection and corresponding gain reduction would be an integrated part of the signal processing in the hearing aid 2.

The choice of good criteria for whistle detection will in a practical implementation be based on a trade-off between the correct detections and true positive rates. A high correct detection rate may also include numerous incorrect detections, leading to a low true positive rate, and vice versa. In some situations the true positive rate must be prioritized at the expense of a higher correct detection rate. This is done because it is assumed that whatever gain reduction strategy is implemented, it will not return to normal gain immediately after the detection of a whistle tone, thus suppressing the whistle tones that might have followed the initial block. Furthermore, high true positive rate ensures that unnecessary gain reductions are limited.

An alternative embodiment includes a hearing aid with a feedback cancellation filter and an amplification control unit, for example an AGC unit.

Alternatively the gain reduction attack and release times may be chosen in dependence of the compression ratio of the hearing aid 2. In one embodiment the rate of compression can either be chosen as linear, 2:1 or 3:1. This reflects how the gain setting is calculated within the hearing aid.

As illustrated above, whistle detection based on a power criterion is feasible in a hearing aid. However, as will be understood by those familiar in the art, the claimed invention may be embodied in other specific forms and utilize any of a variety of different algorithms without departing from the spirit or essential characteristics thereof. For example the selection of an algorithm is typically application specific, the selection depending upon a variety of factors including the expected processing complexity and computational load. The specification and drawings are, accordingly, to be regarded in an illustrative rather than restrictive sense. The claimed inventions are intended to cover alternatives, modifications, and equivalents.

The invention claimed is:

1. A method for detecting whistling in an audio system, comprising:

determining an average frequency of an input signal of the audio system using hardware;

sampling the input signal in consecutive blocks of at least one sample, wherein the average frequency is determined blockwise; and determining whether feedback related whistling is present in the input signal of the audio system by evaluating a stability of the average frequency, wherein the evaluation of the stability of the average frequency comprises:

performing a subtraction operation using values of the determined average frequency for two blocks to obtain a result; and comparing the result to a first threshold value; and determining a function of the result, wherein the function comprises an absolute value function.

2. A method for detecting whistling in an audio system, comprising:

determining an average frequency of an input signal of the audio system using hardware;

sampling the input signal in consecutive blocks of at least one sample, wherein the average frequency is determined blockwise; and determining whether feedback related whistling is present in the input signal of the audio system by evaluating a stability of the average frequency, wherein the evaluation of the stability of the average frequency comprises:

performing a subtraction operation using values of the determined average frequency for two blocks to obtain a result; and comparing the result to a first threshold value; and determining a function of the result, wherein the function is equal to 0 if an absolute value of the result is less than a second threshold value.

3. The method according to claim 2, wherein the function is equal to an absolute value of the result if the absolute value is larger than or equal to the second threshold value.

4. The method according to claim 1, further comprising determining an average of differences over a number of the blocks.

5. The method according to claim 4, wherein the act of determining the average comprises determining a moving average.

6. The method according to claim 1, further comprising transforming the input signal into a frequency domain.

7. The method according to claim 1, further comprising comparing a power or an energy content of the input signal with a third threshold value.

8. A method for detecting whistling in an audio system, comprising:

determining an average frequency of an input signal of the audio system using hardware;

sampling the input signal in consecutive blocks of at least one sample, wherein the average frequency is determined blockwise; and determining whether feedback related whistling is present in the input signal of the audio system by evaluating a stability of the average frequency, wherein the evaluation of the stability of the average frequency comprises:

performing a subtraction operation using values of the determined average frequency for two blocks to obtain a result; and comparing the result to a first threshold value;

wherein the determination of the average frequency of the input signal comprises determining a centroid of the input signal.

9. The method according to claim 1, wherein the audio system comprises a communication system, the communication system being a hearing aid, a headset, or a telephone system.

10. A hearing aid, comprising:

a microphone for the provision of an input signal;

a signal processing unit;

a whistle detector unit that is configured to detect whistling in the hearing aid;

a receiver for the provision of an output sound signal to be presented to a user of the hearing aid; and an amplification controller that is configured to adjust a gain of the hearing aid based on the detected whistling, wherein a response time of the amplification controller is based on whether the whistling is detected or not, the response time comprising an attack time and a release time, and wherein the attack time or the release time, or both the attack time and the release time, is adjusted adaptively in response to the detected whistling for a predetermined period of time;

wherein the whistle detector is configured for:

determining an average frequency of the input signal of the hearing aid;

sampling the input signal in consecutive blocks of at least one sample, wherein the average frequency is determined blockwise; and determining whether feedback related whistling is present in the input signal of the hearing aid by evaluating a stability of the average frequency, wherein the evaluation of the stability of the average frequency comprises:

performing a subtraction operation using values of the determined average frequency for two blocks to obtain a result; and comparing the result to a first threshold value.

11. The hearing aid according to claim 10, further comprising a feedback cancellation filter, wherein the hearing aid is configured to adjust at least one parameter of the feedback cancellation filter in response to the detected whistling.

12. A hearing aid, comprising:

a microphone for the provision of an input signal;

a signal processing unit;

a whistle detector unit that is configured to detect whistling in the hearing aid;

a receiver for the provision of an output sound signal to be presented to a user of the hearing aid; and an amplification controller that is configured to adjust a gain of the hearing aid based on the detected whistling, wherein the amplification controller is configured to successively determine gain correction values, and wherein at least one of the gain correction values depends on at least one previous one of the gain correction values;

wherein the whistle detector is configured for:

determining an average frequency of the input signal of the hearing aid;

sampling the input signal in consecutive blocks of at least one sample, wherein the average frequency is determined blockwise; and determining whether feedback related whistling is present in the input signal of the hearing aid by evaluating a stability of the average frequency, wherein the evaluation of the stability of the average frequency comprises:

performing a subtraction operation using values of the determined average frequency for two blocks to obtain a result; and comparing the result to a first threshold value.

13. A hearing aid, comprising:

a microphone for the provision of an input signal;

a signal processing unit;

a whistle detector unit that is configured to detect whistling in the hearing aid;

a receiver for the provision of an output sound signal to be presented to a user of the hearing aid; and an amplification controller that is configured to adjust a gain of the hearing aid based on the detected whistling, wherein the amplification controller is configured to cease an attenuation, if the level of the attenuation has been substantially equal to a maximum level of attenuation for a predetermined period of time;

wherein the whistle detector is configured for:

determining an average frequency of the input signal of the hearing aid;

sampling the input signal in consecutive blocks of at least one sample, wherein the average frequency is determined blockwise; and determining whether feedback related whistling is present in the input signal of the hearing aid by evaluating a stability of the average frequency, wherein the evaluation of the stability of the average frequency comprises:

performing a subtraction operation using values of the determined average frequency for two blocks to obtain a result; and comparing the result to a first threshold value.

* * * * *